F. H. RICHARDS.
FEED MECHANISM.
APPLICATION FILED AUG. 22, 1901. RENEWED JAN. 29, 1909.

919,233.

Patented Apr. 20, 1909.
5 SHEETS—SHEET 2.

Witnesses:
H. G. Dieterich
F. G. Campbell

Inventor:
F. H. Richards

F. H. RICHARDS.
FEED MECHANISM.
APPLICATION FILED AUG. 22, 1901. RENEWED JAN. 29, 1909.

919,233.

Patented Apr. 20, 1909.
5 SHEETS—SHEET 3.

Witnesses:
H. G. Dieterich
F. G. Campbell.

Inventor:
F. H. Richards.

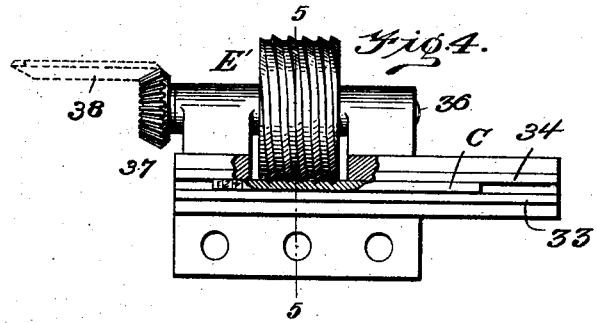
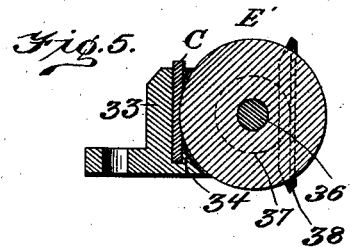
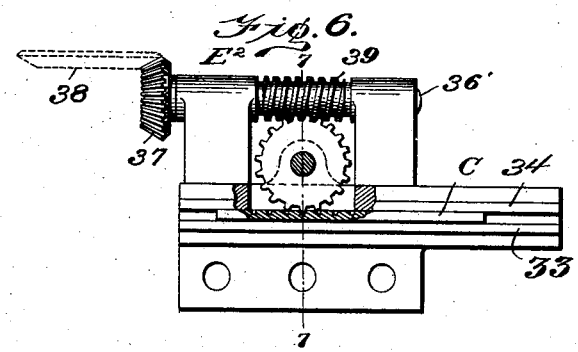
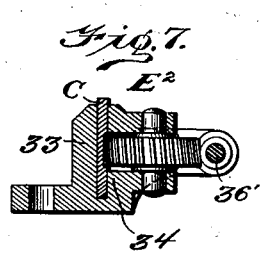
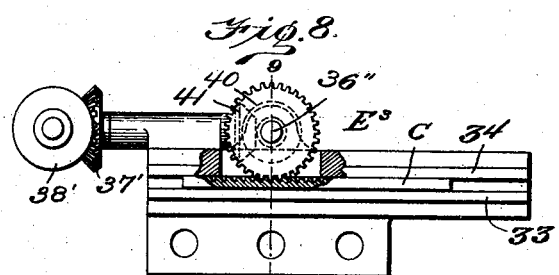
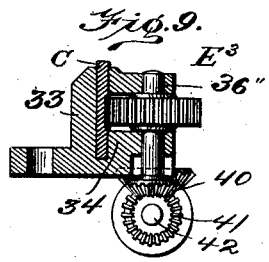
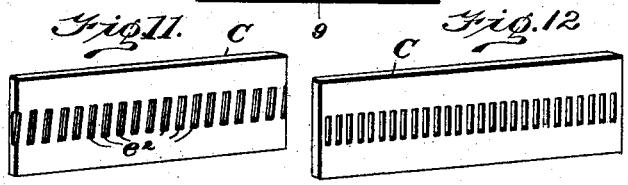
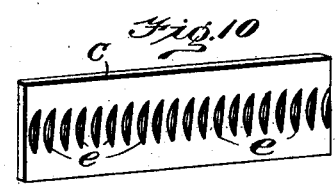

F. H. RICHARDS.
FEED MECHANISM.
APPLICATION FILED AUG. 22, 1901. RENEWED JAN. 29, 1909.
919,233.
Patented Apr. 20, 1909.
5 SHEETS—SHEET 5.
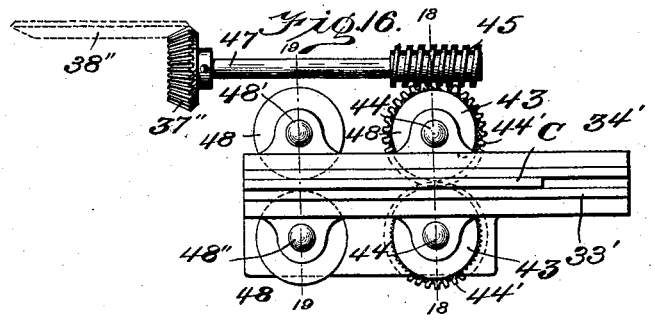
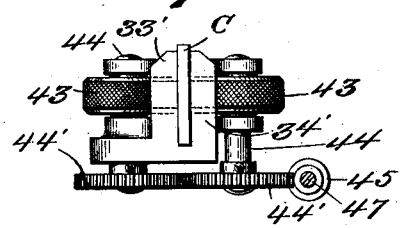
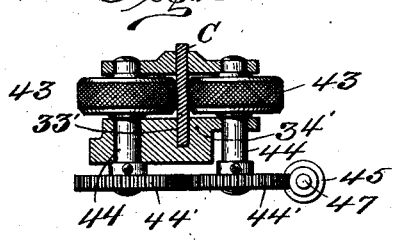
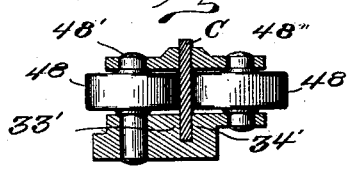
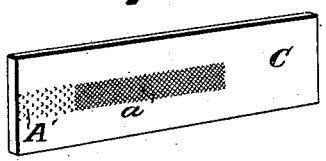
Witnesses:
H. G. Dieterich
F. B. Campbell
Inventor:
F. H. Richards

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

FEED MECHANISM.

No. 919,233.          Specification of Letters Patent.          Patented April 20, 1909.

Application filed August 22, 1901, Serial No. 72,884. Renewed January 29, 1909. Serial No. 475,082.

*To all whom it may concern:*

Be it known that I, FRANCIS H. RICHARDS, a citizen of the United States, residing at Hartford, in the county of Hartford and State of Connecticut, have invented certain new and useful Improvements in Feed Mechanism, of which the following is a specification.

This invention relates to means for imparting an intermittent or step-by-step movement to a member, such, for instance, as a typebar-blank, or a component member of a composite typebar during the progress of making a typebar. For example, the present invention is adapted for imparting movements to a blank which is to be subjected to appropriate operations to convert the same into a finished article, and it embodies a mechanism for feeding variable distances, a blank from which or on which types are to be made, to bring successive portions of the blank into proper relation with the type-making mechanism.

When the direction of the feeding movement is uniformly in one direction, I will usually employ, in carrying the present improvements into practice, a feed element or actuator adapted to engage directly with the blank and by its movement serving to shift the latter forward step by step. If the present invention is applied to a typebar mechanism in which a succession of types is produced through the action of successively-selected and operated dies, this forward movement of the blank is advantageously controlled at each step by the respective selected dies, and since these dies represent letters of the alphabet and other characters of composition which are of different widths, a mechanism embodying the present improvements will usually include means for imparting variable movements to the blank corresponding to the varying widths of the type-making dies or instrumentalities successively brought into working position.

Figure 1:
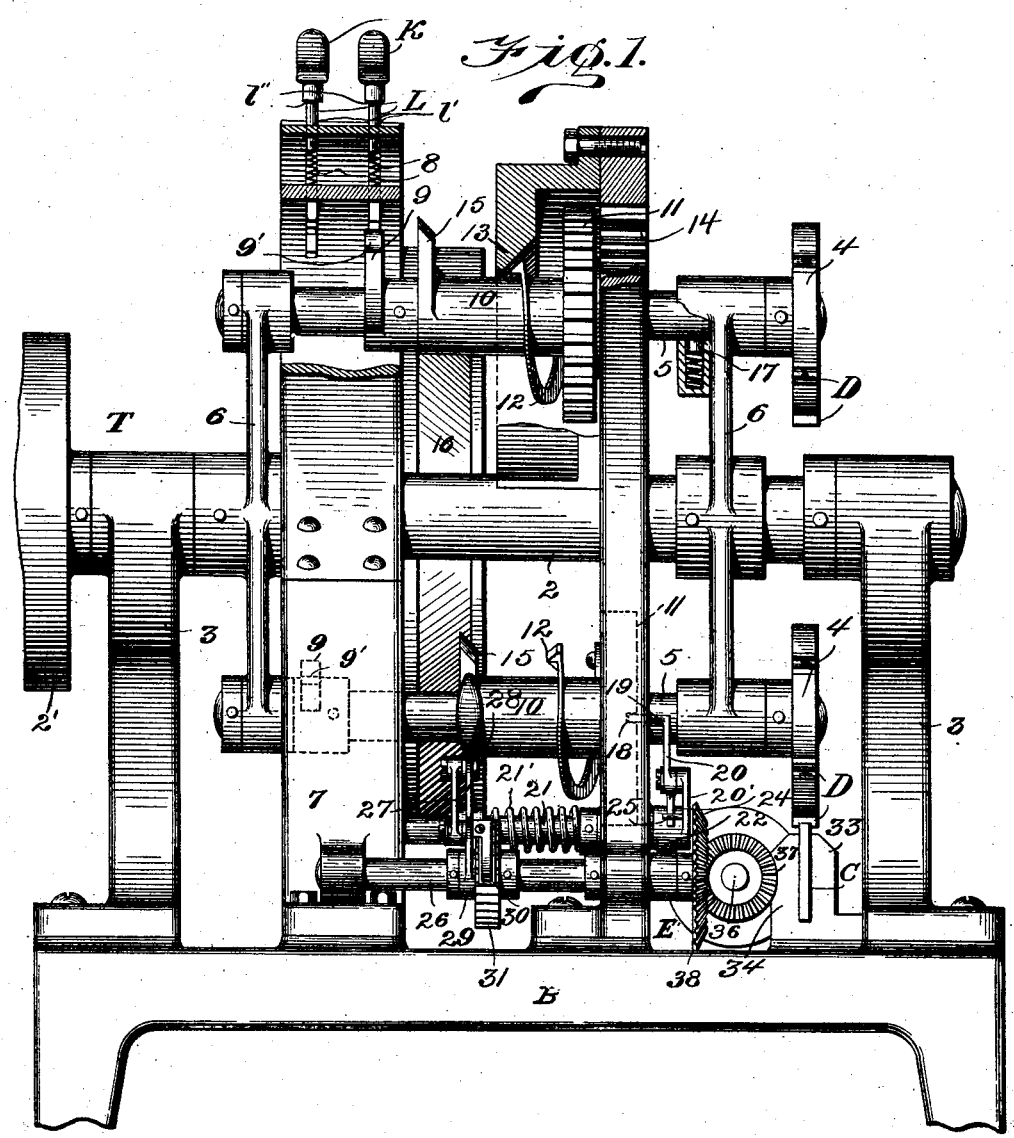
Figure 2:
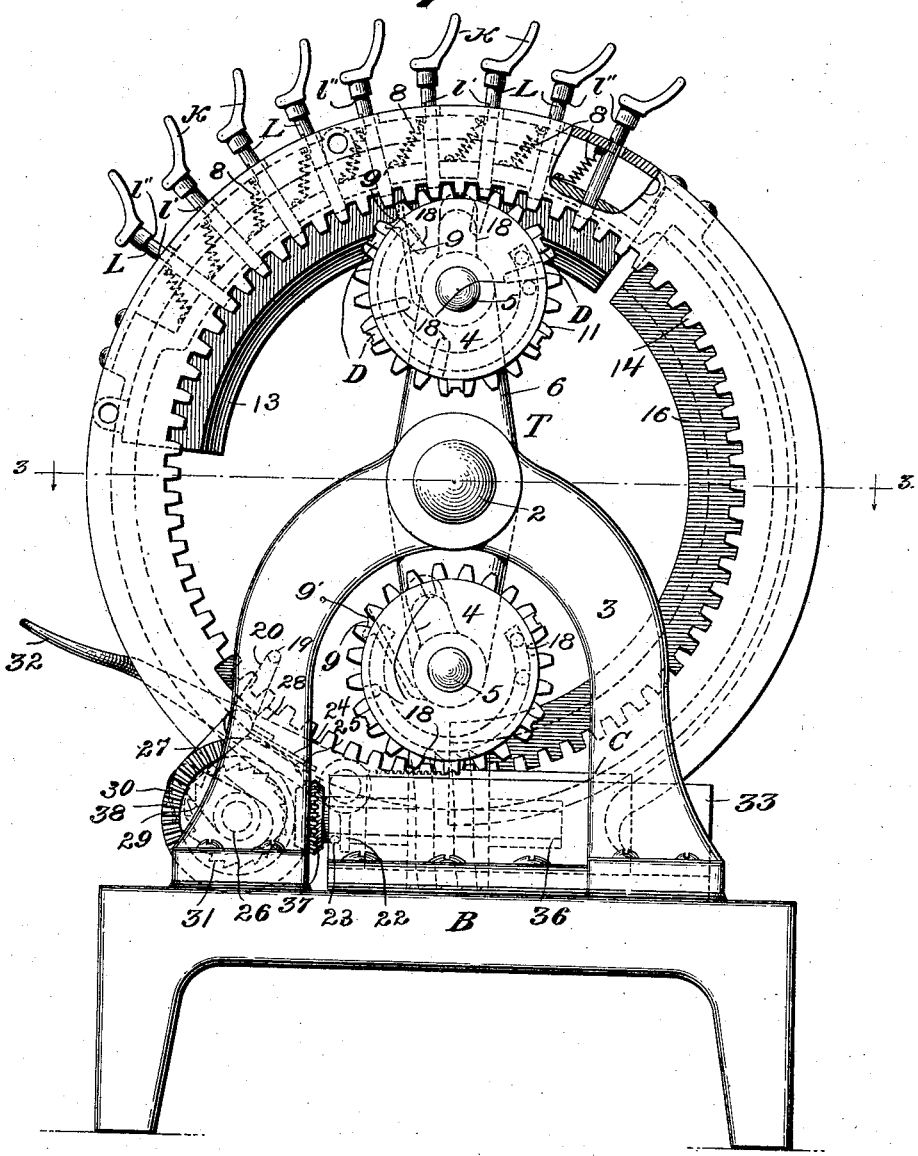
Figure 3:
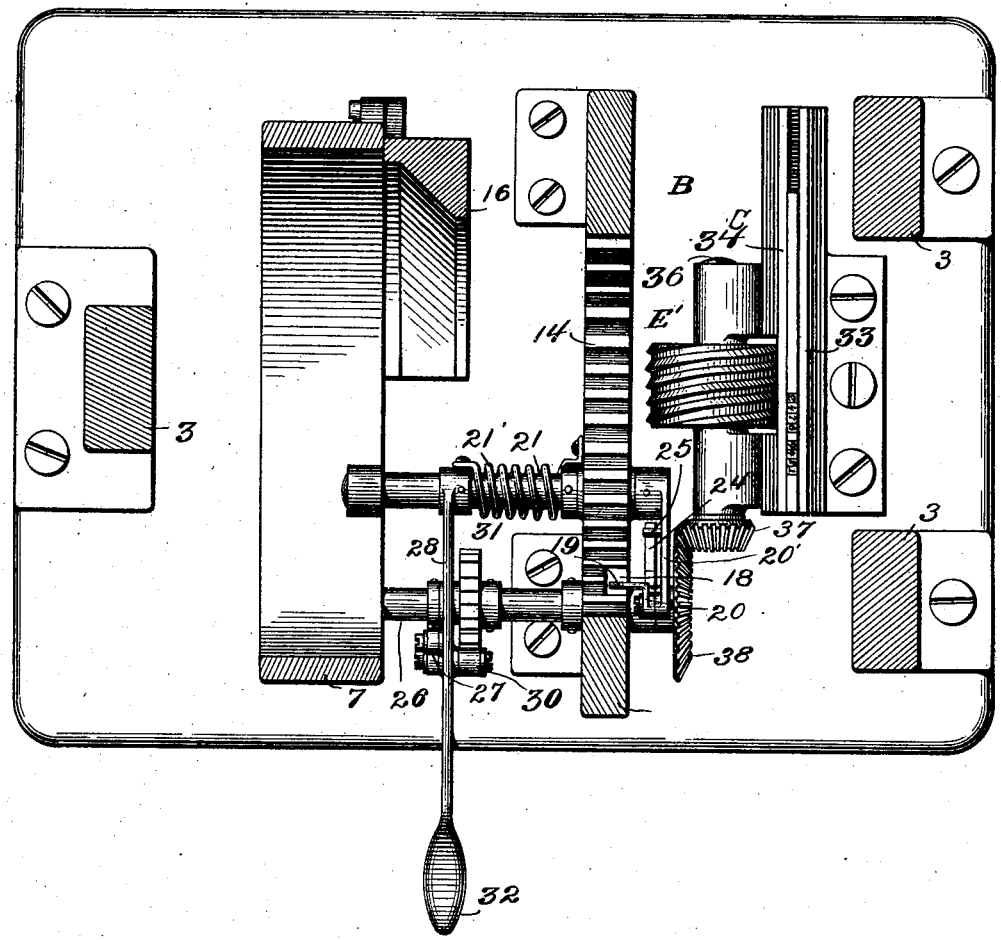

In the drawings accompanying this specification, Figure 1 is a side elevation of a mechanism embodying my present improvements and which is adapted to impart a step by step variable movement to a typebar-blank, parts of the figure being broken away the better to show parts lying beyond. Fig. 2 is an end view of the mechanism looking from the right in Fig. 1. Fig. 3 is a horizontal cross-sectional view on the plane of the line 3—3 in Fig. 2, the turret mechanism being entirely removed, the better to show the details of the feed mechanism lying beneath. Fig. 4 is a plan view of the actuator indicated and shown in the preceding figures and certain of its associated parts, illustrating the actuator in engagement with a blank located between its supporting guides, certain portions being shown in section. Fig. 5 is a cross-sectional view on the plane of the line 5—5 in Fig. 4. Fig. 6 is a view similar to Fig. 4, illustrating a modified form of actuator. Fig. 7 is a view similar to Fig. 5, the plane of the section being taken on the line 7—7 in Fig. 6. Fig. 8 is a view similar to Figs. 4 and 6, illustrating still another modified form of actuator. Fig. 9 is a view similar to Figs. 5 and 7, the plane of the section being indicated by the line 9—9 in Fig. 8. Figs. 10, 11, and 12 are perspective views representing a short-length blank provided with notches, or depressions on their side faces adapted, respectively, to be engaged with the particular form of actuators set forth in Figs. 4, 6 and 8. Figs. 13, 14, and 15 are longitudinal sections of the blanks, shown in Figs. 10, 11, and 12, respectively, the plane of each section being substantially parallel to the longitudinal edges of the corresponding blank. Fig. 16 shows in addition to a further modified construction of actuator or feed device, means for smoothing down the bur or roughness which may have been thrown up by the use of such an actuator. Fig. 17 is an end elevation of the parts shown in Fig. 16, the view being taken from the right of the latter figure. Fig. 18 is a cross-section on the plane of the line 18—18 in Fig. 16, certain of the parts being shown in elevation. Fig. 19 is a similar section on the plane of the line 19—19 in Fig. 16, certain of the parts being also shown in elevation, while other details are omitted; and Fig. 20 is a perspective view of a typebar blank, indicating in a general way the condition of the side surface thereof after the same has been engaged by the actuator set forth in Figs. 16, 17, and 18, a portion of the roughened surface having been smoothed down by the operation of the smoothing rollers shown in Figs. 16 and 19.

Similar characters of reference designate corresponding parts in all the figures.

A typebar-machine of simple construction is shown in the drawings attached to this specification for the purpose of disclosing an embodiment of the features of the present invention, which latter, it may be stated, includes an actuator serving to effect the shifting of a blank or other element, combined with means for imparting a discontinuous or interrupted motion to the actuator, this means preferably possessing a capacity of operation whereby the amount or extent of the separate movements imparted to the blank, etc., may be varied. It will be understood, however, that in so illustrating an application of the invention I do not contemplate the limitation thereof to embodiment in the specific form of mechanism shown, but consider the invention in its broad aspect to be co-extensive with the elemental organization above outlined; that is to say, any mechanism which embraces an actuator of a proper form disposed in coöperative relation with means for imparting a discontinuous motion thereto.

Referring now particularly to the specific construction of mechanism shown, there is embodied therein a plurality of type-dies appropriate for producing a desired series of types on the edge of a blank, combined with means under the control of the several dies for shifting the blank along step by step, and bringing consecutive portions of the edge of the blank successively to the working point of the machine at which the dies selectively operate to produce the desired succession of types and word-separating spaces. The particular species of mechanism to which the present machine belongs is that wherein a rotatable die-carrier or plurality of the same is mounted upon a rotatable main-carrier or turret, which by its motion serves to convey the carriers to the working point, but normally in inoperative relation with a blank located thereat. In the construction shown a suitable supporting base-plate, designated in a general way by B, is provided whereon the various operative members are mounted.

For the purpose of bringing a selected die to the working point and causing its operation thereat by a rolling movement over the edge of the blank, there is provided suitable mechanism for initiating, continuing, and ultimately arresting, the rotary motion of the proper die-carrier under the control of the operator.

Coming now to a more particular description of the various details, the main carrier or turret is designated in a general way by T, and embodies a shaft 2, mounted in bearings provided in, or supported on, uprights 3—3 erected from the base-plate B. This shaft 2 is confined to a rotary motion in its bearings, and for its actuation a pulley 2' is shown attached thereto, which pulley may be driven by a belt from any suitable source of power, not shown. In this instance two die-carriers 4—4 are shown, attached to respective shafts 5—5, each mounted in bearings carried by arms 6—6, respectively, a pair for each shaft. These arms extend from the main shaft 2 and are rigid therewith, thus causing, during the rotation of the turret, the revolution of the shafts 5—5 about the axis of the former shaft.

During the rotary movement of the turret, the dies, designated in a general way without preference by D, upon each die-carrier 4, are inoperative to impress a properly located and supported blank, but when the rotation of a die-carrier is initiated at a proper point in the path of orbital movement of the carrier, that die, which is co-ordinated with such point, operates, when conveyed to the working point of the machine to roll over the edge of a blank located thereat, and to form in or on such blank a type, which latter is formed therefor as the result of the rolling action to which the material of the blank is subjected.

For the purpose of initiating the rotation of either die-carrier or die-wheel 4, I have indicated in a conventional way the usual devices employed in mechanisms of this class embodying a series of keys, designated in a general way by K, attached to corresponding latches L suitably mounted in a latch-frame 7 erected upon the base-plate B. Two series of keys and corresponding latches are herein shown displaced axially of the turret, while each latch L is, when released, thrust inward towards the axis of the turret by a corresponding spring 8 attached to the latch and to a fixed portion of the latch-frame. It will be understood that the key and latch mechanism illustrated are merely typical of a more perfect construction, since the present illustrated mechanism is intended as a conventional representation thereof only.

It will be noted that each spring 8 is arranged obliquely with reference to the axis of its corresponding latch, and that each latch is provided with a notch l' adapted to coöperate with the edge of the opening in the latch-frame through which the latch moves. Furthermore, each series of latches in the present case is shown as being made up of nine separate members disposed at different points concentrically about the turret axis, although, of course, a greater or lesser number may be used, depending upon the number of separate amounts of rotative movement which it is desired to impart to the corresponding shaft 4 and its attached die-carrier. In Fig. 2 the series of latches are represented in their inoperative or retracted position. When it is desired to set a latch, and hence effect the rotative movement of a die-wheel or carrier, and the consequent operative movement of the selected die, the corresponding key is, in the simple construction illustrated, urged laterally to disengage its notch l' from the edge of the latch-frame, whereupon the attached spring 8 projects the latch inward until its movement is arrested by the contact of a shoulder $l''$ on the latch with the latch-frame.

Adapted to coöperate with the projected latch is a starter 9, one for and attached to each shaft 5, herein shown in the form of a starting-arm, the starting-arms for the two shafts being arranged in the planes of the two series of latches L. While the turret is rotating, and the latches are withdrawn, no coöperation of a latch and a starting-arm takes place, but when a latch is set, the starting-arm located in the plane of that series of which it forms a member, upon coming into contact therewith causes the angular movement of the shaft to which it is attached, initiating the rotation of the latter. According to the present construction which, it may be remarked, is illustrative merely of one construction for accomplishing the same result, this rotation is continued as the result of the operation of the following mechanism, it being premised that the mechanism for each shaft is the same. Surrounding each shaft 5 and compelled to rotate therewith, but shiftable axially of the shaft (as by a key-and-slot construction), is a corresponding sleeve 10, carrying a pinion 11 and also an actuator or cam-arm 12.

During the normal rotation of the turret, that is, with the dies inoperative to impress a blank located at the working point of the machine, the cam-arm 12 occupies a position in which it is free from engagement with a corresponding cam 13. When, however, the shaft 5 has started rotating as the result of the coöperation of its starting-arm 9 with a projected latch, the cam-arm is shifted into a position in which it coöperates with such cam. The inclination of the cam surface of this cam is such during the further coöperation of the starting-arm and the projected latch, that it operates through the contact of the cam-arm 12 therewith, to shift the sleeve 10 longitudinally of the shaft 5 and bring the pinion 11 into engagement with a fixed driving-gear 14, which is shown as an internal gear. Upon such engagement taking place the sleeve and the shaft upon which it is mounted continue their rotation during the rotary movement of the turret. Before, however, the actuated starting-arm 9 has left the projected latch a resetting socket 9' at the end of the former will have operated to thrust the latch outward thus permitting the reëngagement of the notch 1' thereon with the edge of the latch-frame. During the further rotation of the turret the independent rotation of the shaft 5 and its connected parts continues until after the dies have passed the working point, whereupon a cam-arm 15 will be brought into engagement with a cam member 16, having an oppositely-inclined cam-face, which operates to cause the shifting of the sleeve 10 in the opposite direction and consequently the disengagement of the pinion 11 from the driving-gear 14. With this release of the pinion 11 the positive rotation of the shaft 5 about its own axis ceases, and to insure the correct positioning of such shaft, and consequently of the die-carrier attached thereto (which, it will be understood, is essential in order that the proper amount of rotative movement of a die-carrier may take place at the next die-selection) there may be provided a suitable form of detent device for stopping the movement of the carrier upon the release of its pinion 11 in a definite position. This device, as herein shown, comprises a spring-pressed plunger 17, suitably mounted to coöperate with a flattened portion of the shaft and operating as a brake to arrest the rotation of the shaft in a position in which the plunger is in contact with such portion.

The present mechanism embraces means for automatically shifting the blank or other member through the instrumentality of a selected and rotating die-carrier during the revolution of the latter around the axis of the turret-shaft, the feeding of such member being, under the control of parts coördinated with the respective dies thereon. Entering upon a description in detail of the various features of this portion of the mechanism, each die-carrier is coördinated with a number of faces each adapted during the movement of the dies to which it is related to the working point for effecting the movement through intervening mechanism of the feed element or actuator hereinbefore referred to. These feed-faces, designated by 18 without preference, are herein shown as constituted by the bottoms of recesses, which are conveniently made in the radial face of each pinion 11, and to enable such feed-faces to regulate the variable movements of the blank, they are shown of different radial depths, since when so constructed they are adapted to effect the described movements of the blank.

As an engaging pinion rolls around the surface of the driving-gear a recess 18, corresponding to that die which will ultimately roll over the blank at the working point, is brought into engagement with a pin 19, extending from an arm 20, pivoted to a rock-lever 20' affixed to a rock-shaft 21. The normal position of this rock-shaft is determined by a spring 21' which tends to turn the shaft and bring a stop-pin 22 thereon in contact with a stop 23 projecting from a fixed portion of the machine. As the die-carrier continues its orbital motion with the pin in the recess the former is carried outward and through the described connections the rock-shaft 21 is rocked in its bearings until, as the die-carrier continues its motion, the arm 20 is deflected from its position and the die-carrier leaves the pin 19. In order to insure the correct normal positioning of the arm 20 with the pin 19 in the path of a selected and rotating die-carrier, I have shown a spring arm 24 extending from the arm and located between stops 25—25. As the result of the action of the spring 21' and the spring-arm 24 the rock-shaft 21 and the parts mounted thereon are caused to assume their proper relative position to coöperate with a recess in a die-carrier when next set in rotation.

An intermittent movement is imparted to a shaft 26 mounted in bearings in the body of the internal-gear 14 and in the latch-frame 7 through a pawl-and-ratchet mechanism from the shaft 21, the transmitting mechanism embodying a link 27 pivoted at one end to an arm 28 extending from the latter shaft, and at the other end to a pawl-carrier 29 supporting a spring-pressed pawl 30 engaging with a ratchet wheel 31 secured to the shaft 26. A hand-lever 32 may also be provided to enable the shaft 26 to be rocked manually, when desired. From this shaft 26 motion is transferred to the feed element or actuator already referred to.

As illustrated in the drawings attached to the present specification, the member is adapted to be fed under the dies, and on which the latter operate to form a determinate succession of types as they roll in turn over its edge, is shown in the form of a blank whose type-forming portion or edge is integral with the main body of the blank. It will be understood, however, that the invention is applicable to the feeding of other members, such, for instance, as a typebar body or type-carrier.

In the present organization also this blank designated in a general way by C is fed under the die in the plane of rotation of the die-carriers, but it will be understood also that this particular relation is chosen merely for illustrative purposes and in no wise constitutes a limitation of the applicability of the present invention. The blank, as shown, is adapted to be fed through a slot formed between side pieces 33 and 34, serving to support and maintain the blank upright during the rolling movements of the dies. This blank, furthermore, may be a short-length blank, that is one approximately equal to the length of the line of types which is to be made, or it may consist of a continuous ribbon or strip which is fed through the slot and after having types made upon it is severed into the requisite lengths to constitute typebars.

I prefer to have the actuator or feed element, whose movement serves to shift the blank step by step through the slot between the uprights 33 and 34 engaged directly with the surface of the blank, since such a mode of feeding the latter is convenient and necessitates but few parts. This actuator may be of various forms and engaged with the surface of the blank in divers manners. Thus, for instance, it may be of such form as to adapt it to engage with a series of shoulders previously formed in the blank, or it may be of such a construction as to permit it to engage with the blank and cause the movement without necessitating a previous treatment of the blank. On the other hand, it may be a combined shoulder-forming and shoulder-engaging device, whose operation serves to simultaneously form shoulders and engage with them to thereby effect the feeding of the blank. A device of this latter character is shown and claimed in an application filed by me September 13, 1901, Serial No. 75,305.

Referring to the particular form of actuator set forth in Figs. 4 and 5, and designated by E', this is shown to be a rotatable member provided with a screw-thread upon its cylindrical surface, such thread being shown as in the nature of a ratchet-thread. The shoulder-forming notches, see $e$, Fig. 10, with which the threads of this actuator engage are best inclined somewhat to the vertical axis of the blank corresponding in their inclination to the pitch of the thread. The actuator will be provided with a suitable shaft 36 which will be mounted in proper bearings and it may conveniently be driven from the shaft 26 by means of bevel-gears, such, for instance, as 37 and 38. Instead of this construction, such a one as indicated in Figs. 6 and 7 may be adopted, in which the actuator $E^2$ is in the nature of a worm-wheel suitably mounted to engage with proper notches in the blank and driven from a worm 39 secured to a shaft 36' as before. The notches $e^2$ with which the worm-wheel engages will be preferably inclined corresponding to the inclination of the teeth of the worm-wheel.

For the purpose of effecting the movement of the blank an ordinary gear-wheel may be adopted, see $E^3$, Figs. 8 and 9. In this case the notches will most advantageously be substantially perpendicular to the longitudinal axis of the blank, and in the construction shown the shaft 36" is driven through a pair of bevel-gears 40 and 41, by means of a shaft 42 rotated from the shaft 26 by means of proper bevel-wheels 37' and 38'.

In all the forms of feed elements or actuators described the notches forming the shoulders for engagement with the actuator will, in practice, be preformed in the face of the blank or blanks.

In the form of actuator illustrated in Figs. 16 to 19, inclusive, no such preforming of the notches will ordinarily be required. In these figures a pair (the feed device preferably embodying two) of roughened or knurled rollers 43—43 are shown disposed on opposite sides of the blank and in engagement with opposite faces thereof, the rollers being located in sufficient proximity to each other to adequately grip the blank and cause its forward movement through the slot between the uprights 33' and 34' when the rollers are positively rotated. Each roller is shown provided with a shaft 44 having a gear-wheel 44' at one end which engages with the gear-wheel on the other shaft. A worm-wheel 45 may be used for effecting the rotation of the rollers, this worm-wheel engaging with one of the gear-wheels 44' and being attached to a shaft 47 provided with a bevel pinion 37'' driven from a corresponding pinion 38'' which may be attached to the before-mentioned shaft 26. Ordinarily when this last described form of actuator is used for feeding the blank, the face of the latter will be left in a roughened condition, see a, Fig. 20. This roughness may be removed and the surface smoothed down by mounting a pair of rollers 48—48, having shafts 48'—48'', respectively, in the uprights 43' and 44' and causing the blank to pass between them, thus rolling down the elevations and leaving the surface in a comparatively smooth condition as indicated by A' in Fig. 20.

A machine organized and constructed and illustrated and described operates substantially in the following manner: Assuming a key K to have been actuated and the attached latch L to be in its innermost position (the turret being in motion) when the starting-arm 9, which is located in the plane of that series of latches of which the projected latch forms a member, comes into contact with the latch the rotation of the shaft 5 will commence, the sleeve 10 surrounding such shaft rotating with it. Sometime before the starting-arm leaves the latch, the cam-arm 12 will be brought into engagement with the cam surface of cam 13 and the pinion 11 will be shifted into engagement with the driving-gear 14, as already described. Shaft 5 will now continue its rotation, but before the starting-arm disengages itself from the latch, the latter will have been thrust inward in the described manner to cause the reëngagement of the notch l' thereon with the latch frame 7 resulting in the retention of the latch in its outward or normal position. Before the die to which the projected latch is related reaches the working point the recess on the radial face of the rotating and revolving pinion and which forms a feed face will be brought into engagement with the pin 19, and the rock-shaft 21 will be rocked in its bearings, causing, it will be understood from the foregoing description, the angular movement of the shaft 26 in its bearings, and through the intervening mechanism the partial rotation of the actuator E. The blank will as a result be shifted lengthwise of the slot between the supporting uprights into a position in which the proper portion of its edge is brought under the die, the extent of this movement being determined by the throw of the rock-lever 20' which in turn is determined, it will be readily understood, by the radial depth of the recess in the face of the pinion.

As the given die nears its working position it will approach the edge of the blank along a path corresponding to that adjacent to the cusp of a cycloid, and as it leaves the blank after rolling over the same, it will describe the second or following branch of the cycloidal curve adjacent to such cusp. At sometime subsequent to the disengagement of the die from the blank the cam-arm 15 will, by reason of the continued movement of the parts, be brought into engagement with the cam 16, whereupon the sleeve 10, and hence the pinion 11 attached thereto, will be shifted in the opposite direction and the latter disengaged from the driving gear 14. The rotary motion of the shaft 5 about its axis is now free to be checked, a result which follows from the performance by the plunger 17 of its function as a precision brake with the shaft in the same normal rotarial position. Such, substantially, is the operation of the various features embodied in the illustrated mechanism, the action being repeated at each actuation of a key, while the amount to which the blank is fed varies with the particular die chosen in the event that this is desired and there is an existing variation in the depth of the feed recesses, as described.

Having described my invention, I claim—

1. The combination with a die carrier and a rotary die carrier support upon which the die carrier is rotatably mounted, of a support for a type bar element and means under the control of the selected die for imparting an intermittent motion to an element therein.

2. The combination with a die carrier and a rotary die carrier support upon which the die carrier is rotatably mounted, of a support for a type bar element and means under the control of the selected die for imparting a variable intermittent motion to an element therein.

3. The combination with a die carrier and a rotary die carrier support upon which the die carrier is rotatably mounted, of a support for a typebar element, and means under the control of the selected die and comprising an actuator adapted to engage with an element in said support for imparting an intermittent motion to the element.

4. The combination with a die carrier and a rotary die carrier support upon which the die carrier is rotatably mounted, of a support for a typebar element, and means under the control of the selected die and comprising an actuator adapted to engage with an element in such support for imparting a variable intermittent motion to the element.

5. The combination with a support for a typebar element, of selective dies a die carrier; a rotary die carrier support upon which the die carrier is rotatably mounted, and means under the control of the selected die for feeding an element in such support to bring successive portions of the edge thereof into coöperative relation with the successively-selected dies.

6. The combination with a support having a typebar element, of a plurality of selective dies a die carrier; a rotary die carrier support upon which the die carrier is rotatably mounted, and means under the control of the selected die for feeding an element in such support variable distances to bring successive portions of the edge thereof into coöperative relation with the successively-selected dies.

7. The combination with a support for a typebar element, of a plurality of selective dies a die carrier; a rotary die carrier support upon which the die carrier is rotatably mounted, and means coördinated with said dies for controlling the feeding of an element in such support to bring successive portions of the edge thereof into coöperative relation with the successively-selected dies.

8. The combination with a support for a typebar element, of a plurality of selective dies a die carrier; a rotary die carrier support upon which the die carrier is rotatably mounted, and means coördinated with said dies for controlling the feeding of an element in such support variable distances to bring successive portions of the edge thereof into coöperative relation with the successively-selected dies.

9. The combination with a support for a typebar element, of a plurality of selective dies a die carrier; a rotary die carrier support upon which the die carrier is rotatably mounted, and an actuator for feeding the element in such support to bring successive portions of the edge thereof into coöperative relation with the successively-selected dies.

10. The combination with a support for a typebar element, of a plurality of selective dies a die carrier; a rotary die carrier support upon which the die carrier is rotatably mounted, and an actuator for, and means coördinated with, the respective dies for controlling the feeding of an element to bring successive portions of the edge thereof into coöperative relation with the successively-selected dies.

11. The combination with a support for a typebar element, of a plurality of selective dies a die carrier; a rotary die carrier support upon which the die carrier is rotatably mounted, and an actuator for, and means coördinated with, the respective dies for controlling the feeding of an element variable distances to bring successive portions of the edge of the element under the successively-selected dies.

12. The combination with a support for a typebar element, of a plurality of selective dies a die carrier; a rotary die carrier support upon which the die carrier is rotatably mounted, an actuator adapted to engage with an element in the support for feeding the element to bring successive portions of the edge thereof under the successively-selected dies, and means under the control of the respective selected dies for controlling the amount of the feeding movement at each step.

13. The combination with a support for a typebar element, of a die carrier; a rotary die carrier support upon which the die carrier is rotatably mounted an actuator, and means embodying a pawl-and-ratchet device for imparting a step-by-step movement to an element in such support.

14. The combination with a support for a typebar element, of a plurality of selective dies a die carrier; a rotary die carrier support upon which the die carrier is rotatably mounted; an actuator; and feeding mechanism embodying a pawl-and-ratchet device for bringing successive portions of the edge of the element under the successively-selected dies.

15. The combination with a support for a typebar element, of a plurality of selective dies; a die carrier; a rotary die carrier support upon which the die carrier is rotatably mounted; means for feeding an element in such support to bring successive portions of the edge thereof into coöperative relation with the successively-selected dies; and feed-faces for controlling the amounts of such feed movements.

16. The combination with a support for a typebar element, of a plurality of selective dies; a die carrier; a rotary die carrier support upon which the die carrier is rotatably mounted; means for feeding an element in such support to bring successive portions of the edge thereof into coöperative relation with the successively-selected dies; and feed-faces of varying depth for controlling the amounts of such feeding movements.

17. The combination with a support for a typebar element, of a plurality of selective dies; a die carrier; a rotary die carrier support upon which the die carrier is rotatably mounted; an actuator engaging with an element in the support; a pawl-and-ratchet device for feeding the element variable distances to bring successive portions of the edge thereof into operative relation with the successively-selected dies; and feed-faces of varying depth for controlling the amounts of such feed movements.

18. The combination with a support for a typebar element, of a plurality of selective dies; a die carrier; a rotary die carrier support upon which the die carrier is rotatably mounted; an actuator adapted to engage with an element in such support; a series of feed-faces; a rock-shaft; an arm supported therefrom; and a projection on the arm adapted to engage with a feed-face upon the selection and movement of a die to the working point.

19. The combination with a support for a typebar element, of a plurality of selective dies; a die carrier; a rotary die carrier support upon which the die carrier is rotatably mounted, an actuator adapted to engage with an element in such support; a series of feed-faces; a rock-shaft; a rock-lever extending from the rock-shaft; an arm carried by the rock-lever; and a projection on the arm adapted to engage with a feed-face upon the selection and movement of a die to the working point.

20. The combination with a support for a typebar element, of selective mechanism; a die-carrier; dies supported upon the carrier a rotary die carrier support upon which the die carrier is rotatably mounted; means for bringing a selected die to the working point; an actuator; and means interposed between said die-carrier and the actuator for imparting a movement to the actuator upon the selection and movement of a die to the working point.

21. The combination with a support for a typebar element, of selective mechanism; a plurality of die-carriers; dies supported upon the carriers; a rotary die-carrier support upon which the die-carriers are rotatably mounted; means for bringing a selected die to the working point; an actuator; and means interposed between said die-carriers and the actuator for imparting a movement to the actuator upon the selection and movement of a die to the working point.

22. The combination with a support for a type-bar element, of selective mechanism; a plurality of die-carriers; dies supported upon the carriers; a rotary die-carrier support upon which the die-carriers are rotatably mounted; means for bringing a selected die to the working position; an actuator; means interposed between said die-carriers and the actuator for imparting a movement to the actuator upon the selection and movement of a die to the working point; and a series of feed faces for controlling the movements imparted to the actuator.

23. The combination with a support for a typebar element, of selective mechanism; a plurality of die-carriers; dies mounted upon the carriers; a rotary die-carrier support upon which the die-carriers are rotatably mounted; means for importing a selected die to the working point; an actuator for imparting movement to an element in such support; feed-faces; a rock-shaft; an arm carried by the rock-shaft; and a pin adapted to engage with a feed-face upon the selection of movement of a die to the working point.

24. The combination with a support for a type-bar element, of selective mechanism; a plurality of selective dies die carriers; a rotary die carrier support upon which the die carriers are rotatably mounted; a series of feed-faces coördinated with the line space values of the dies; an actuator adapted to engage with an element in the support; and means interposed between the actuator and operated by the selection and movement of a die to the working point to impart a movement to the actuator.

25. The combination with a support for a type-bar element, of selective mechanism; a turret; die-carriers mounted upon the turret; dies supported upon the die-carriers and each having, upon its selection, a movement compounded from movements about separate axes; a pinion and driving gear for continuing the rotary movement of a die-carrier after such movement has been initiated by the operation of the selective mechanism; means for discontinuing the rotary movement of a die-carrier after a die has rolled over the edge of the element in the support; a series of feed-faces coördinated with the line space values of the several dies; an actuator; and a lever and pawl-and-ratchet mechanism adapted to be operated by the selection and movement of a die to the working point, and to thereby shift the position of the element in the support.

26. The combination with a support for a typebar element, of a die having a combined orbital and angular movement; an actuator for said element and means for imparting a step-by-step movement thereto.

27. The combination with a support for a typebar element, a plurality of selective dies collectively movable into and out of the general working position; means for feeding an element in such support to bring successive portions of the edge thereof into operative position means to bring the dies to the general position, means to bring a selected die to the working point; a rock shaft; a rock-lever extending from the rock-shaft; and means to engage the lever to positionize a selected die at the working point.

28. The combination with a support for a typebar element, means for feeding said element, a revoluble die carrier axially shiftable relative to said element means for engaging said member when axially shifted for rotating the die carrier, and an actuator for the feed device in the orbit of said member when in its die carrier rotating position.

29. The combination with a support for a typebar, of means for advancing the typebar through said support, a revoluble and rotatable die carrier, a series of dies upon said carrier having different widths, a member rotatable and revoluble with said die carrier and axially shiftable relative thereto, means for engaging said member when in one position of its axial shift for rotating the die carrier, a series of faces carried by said member corresponding to the widths of the respective dies, and an actuator for said feed device located in the orbit of said member when in its die carrier rotating position.

30. The combination with a support for a typebar, of selective mechanism, a turret, die carriers mounted upon the turret, dies supported upon the die carriers, a pinion, gears for continuing the rotary movement of the die carriers after such movement has been initiated by the operation of the selective mechanism, there being a series of feed faces upon said pinion, means for engaging the blank for advancing this, a rock shaft and arm carried by the rock shaft and having a face for the engagement of the feed faces upon the pinion, and a pawl and ratchet connection between said rock shaft and the feeding means.

31. The combination with a support for a typebar, of a plurality of selective dies, a carrier for said dies, means for rotating said carrier, means associated with such carrier and embodying a series of feed faces of varying depths corresponding with the width values of the dies, means for engaging the typebar for passing this through the support, and means for coöperative engagement with said feed faces for actuating said typebar engaging means.

FRANCIS H. RICHARDS.

Witnesses:
FRED. J. DOLE,
JOHN O. SEIFERT.